United States Patent
Wirola et al.

(10) Patent No.: US 10,257,650 B2
(45) Date of Patent: Apr. 9, 2019

(54) DETECTION OF INFRASTRUCTURE CHANGES IN OPPORTUNITY SIGNAL DATA

(71) Applicant: HERE Global B.V., Eindhoven (NL)

(72) Inventors: Lauri Wirola, Tampere (FI); Jari Tapani Syrjarinne, Tampere (FI); Muhammad Irshan Khan, Tampere (FI); Pavel Ivanov, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/866,836

(22) Filed: Jan. 10, 2018

(65) Prior Publication Data

US 2018/0167779 A1 Jun. 14, 2018

Related U.S. Application Data

(63) Continuation of application No. 15/375,980, filed on Dec. 12, 2016, now Pat. No. 9,900,749.

(51) Int. Cl.
*H04W 4/00* (2018.01)
*H04W 4/024* (2018.01)
(Continued)

(52) U.S. Cl.
CPC ........... *H04W 4/024* (2018.02); *G01S 5/0252* (2013.01); *H04W 4/029* (2018.02); *H04W 4/04* (2013.01); *H04W 4/33* (2018.02); *H04W 24/04* (2013.01); *H04W 36/30* (2013.01); *H04W 64/003* (2013.01); *H04W 4/80* (2018.02); *H04W 84/12* (2013.01)

(58) Field of Classification Search
CPC ....... H04W 4/024; H04W 4/33; H04W 4/029; H04W 4/04; H04W 4/80; H04W 24/04;
(Continued)

(56) References Cited

U.S. PATENT DOCUMENTS 8,140,094 B2 3/2012 Morgan et al.
8,468,563 B1 6/2013 Sherwin et al.
(Continued)

FOREIGN PATENT DOCUMENTS

WO 2012032376 A1 3/2012
WO WO2016087008 A1 6/2016

OTHER PUBLICATIONS

PCT International Search Report and Written Opinion of the International Searching Authority dated dated Mar. 27, 2018, for corresponding PCT/EP2017/081798.

*Primary Examiner* — Khai M Nguyen
(74) *Attorney, Agent, or Firm* — Lempia Summerfield Katz LLC

(57) ABSTRACT

The disclosure relates to a method, performed by at least one apparatus. The method may include obtaining new opportunity signal data pertaining to an opportunity signal source and indicating opportunity signal values for particular locations at a site; obtaining previous opportunity signal data pertaining to said opportunity signal source and indicating opportunity signal values for particular locations at said site; comparing at least a part of said opportunity signal values of said new opportunity signal data pertaining to said opportunity signal source of said site and said opportunity signal values of said previous opportunity signal data pertaining to said opportunity signal source of said site for corresponding locations at said site; and classifying said opportunity signal source based at least in part on said comparing.

20 Claims, 7 Drawing Sheets

(51) Int. Cl.
*H04W 4/029* (2018.01)
*H04W 24/04* (2009.01)
*H04W 64/00* (2009.01)
*H04W 36/30* (2009.01)
*H04W 4/33* (2018.01)
*H04W 4/04* (2009.01)
*G01S 5/02* (2010.01)
*H04W 4/80* (2018.01)
*H04W 84/12* (2009.01)

(58) Field of Classification Search
CPC ... H04W 36/30; H04W 64/003; H04W 84/12; G01S 5/0252
See application file for complete search history.

(56) References Cited

U.S. PATENT DOCUMENTS

| | | | |
|---|---|---|---|
| 9,002,349 B2 | 4/2015 | Naguib et al. | |
| 9,002,373 B2 | 4/2015 | Marti et al. | |
| 9,046,591 B1 | 6/2015 | Yang et al. | |
| 2004/0061646 A1* | 4/2004 | Andrews | G01S 5/0036 342/463 |
| 2007/0258409 A1 | 11/2007 | Alizadeh-Shabdiz et al. | |
| 2009/0009410 A1 | 1/2009 | Dolgin et al. | |
| 2009/0117928 A1 | 5/2009 | Ladd et al. | |
| 2009/0280827 A1* | 11/2009 | Michaud | G01S 5/0252 455/456.1 |
| 2012/0081248 A1 | 4/2012 | Kennedy et al. | |
| 2012/0225663 A1 | 9/2012 | Gupta et al. | |
| 2013/0116960 A1* | 5/2013 | Weyn | G01S 5/0252 702/94 |
| 2013/0281111 A1 | 10/2013 | Syrjarinne et al. | |
| 2014/0018095 A1 | 1/2014 | Parvizi et al. | |
| 2014/0171100 A1* | 6/2014 | Marti | G01S 5/0242 455/456.1 |
| 2015/0080020 A1* | 3/2015 | Edge | G01S 5/0236 455/456.1 |
| 2015/0319725 A1 | 11/2015 | Marshall | |
| 2016/0356593 A1* | 12/2016 | Huang | H04W 4/02 |

\* cited by examiner

|    | Building ID | FloorID | BSSID     | MeanRSS  | StdRSS   | Classification |
|----|-------------|---------|-----------|----------|----------|----------------|
| 1  | DM_8981     | 0       | 2CF97DCA… | 3.846486 | 2.608389 | compatible     |
| 2  | DM_8981     | 1       | 2CF97DCA… | 5.46491  | 2.661123 | compatible     |
| 3  | DM_8981     | 0       | 6B120F4E… | 3.656394 | 2.976297 | compatible     |
| 4  | DM_8981     | 1       | 6B120F4E… | 3.687613 | 2.610592 | compatible     |
| ⋮  |             |         |           |          |          |                |
| 16 | DM_8981     | 0       | 127B23EC… |          |          | new            |
| ⋮  |             |         |           |          |          |                |
| 23 | DM_8981     | 0       | 5067F085… | 18.24539 | 8.467863 | incompatible   |
| 24 | DM_8981     | 1       | 5C50154D… | 3.947304 | 0.517119 | indifferent    |

DETECTION OF INFRASTRUCTURE CHANGES IN OPPORTUNITY SIGNAL DATA

This application is a continuation under 37 C.F.R. § 1.53(b) and 35 U.S.C. § 120 of U.S. patent application Ser. No. 15/375,980 filed Dec. 12, 2016 which is incorporated by reference in its entirety.

FIELD OF DISCLOSURE

The disclosure relates to the field of positioning and more specifically to the detecting of infrastructure changes in opportunity signal data, taking appropriate actions in order to maintain the quality of opportunity signal data.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth based positioning solutions, cellular network based positioning solutions and wireless local area network (WLAN) based positioning solutions. Such signals, which have originally not been deployed for positioning purposes or which mainly serve another purpose (such as communication and data transmission), may also be referred to as signals of opportunity or opportunity signals.

As an example, a positioning solution based on WLAN (as an example of a communication network) may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths (RSS) and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

However, these indoor solutions require either deployment of totally new infrastructure (beacons, tags and so on) or manual exhaustive radio-surveying of the buildings including all the floors, spaces and rooms. This is rather expensive and will take a considerable amount of time to build the coverage to the commercially expected level, which in some cases narrowed the potential market segment only to very thin customer base e.g. for health care or dedicated enterprise solutions. Also, the diversity of these technologies makes it difficult to build a globally scalable indoor positioning solution, and the integration and testing will become complex if a large number of technologies is needed to be supported in the consumer mobile devices, such as smartphones.

Thus for an indoor positioning solution to be commercially successful, firstly it should be globally scalable, secondly it should have low maintenance and deployment costs, and thirdly it should offer an acceptable end-user experience. An existing infrastructure in the buildings and/or existing capabilities in the consumer devices should thus be taken into account. Further, existing infrastructures and device capabilities should be used in such a way that makes it possible to not only achieve a precise (e.g. 2-3 m) horizontal positioning accuracy, but also a precise (e.g. close to a 100%) floor detection accuracy.

Keeping the data, which is used for positioning and stored on a positioning server or the mobile device, up to date is another key factor, as the positioning accuracy may be strongly dependent on the up-to-dateness of the data. However, this is impeded by the fact that the infrastructure may change and affect the signals measured by the mobile device. Typical changes of the infrastructure are for example the movement of the corresponding signal source, the development of new constructions or the change of a structure within a building. Thus, using the described approach generally requires the collection of new information from time to time to maintain a good positioning performance. However, it is then a challenge to detect such changes in the infrastructure and to handle the new data with respect to the previous data in an efficient way in order to maintain the required accuracy for positioning. It has turned out to be particularly problematic to detect changes is the infrastructure which are not the result of a change of the location of the signal source but rather the result of other environmental changes. However, if these changes are not detected and considered, the positioning performance will degrade and in the worst case a positioning result will not be usable at all.

SUMMARY OF SOME EMBODIMENTS OF THE INVENTION

According to a first exemplary aspect of the disclosure, a method is described, performed by at least one apparatus, the method comprising:

obtaining new opportunity signal data pertaining to an opportunity signal source and indicating opportunity signal values for particular locations at a site;

obtaining previous opportunity signal data pertaining to the opportunity signal source and indicating opportunity signal values for particular locations at the site;

comparing at least a part of the opportunity signal values of the new opportunity signal data pertaining to the opportunity signal source of the site and the opportunity signal values of the previous opportunity signal data pertaining to the opportunity signal source of the site for corresponding locations at the site; and classifying the opportunity signal source based at least in part on the comparing.

The method may be performed by one or more apparatuses. The apparatus may be an apparatus according to the second exemplary aspect of the disclosure, as will be described in more detail below.

An opportunity signal (also called signal of opportunity, SOP) may be understood to be an artificial or natural signal, which is suitable for use in determining a position and/or orientation of the receiver of the signal, e.g. of a mobile device. The main purpose of the signal may not be to enable the receiver to determine its position or orientation. Rather, the main purpose of the signal may be to transmit data. An opportunity signal may in particular be freely available at all or most times. Examples of such an (artificial) opportunity signal may be a radio signal, e.g. a signal of a broadcast system or a signal of a communication network. A further example of a (natural) opportunity signal may be a geomagnetic signal.

Accordingly, an opportunity signal source is understood to be a source emitting an opportunity signal. At a certain site, opportunity signals of multiple (similar or different) sources may be receivable. An example of an opportunity signal source is a communication node of a communication network or a broadcasting network, for example.

The opportunity signal data indicates opportunity signal values for particular locations. In this regard, the opportunity signal data may be considered to be map data and in particular, in case the opportunity signal is a radio signal, radio map data. As an example, the opportunity signal data may indicate opportunity signal values by storing opportunity signal values in the opportunity signal data. As an example, the opportunity signal data may comprise fingerprints. Each fingerprint may comprise an opportunity signal value and an indication for a particular location, at which the opportunity signal value was measured or is expected to be measured. Thus, an opportunity signal value indicates, for example, a measured or an expected opportunity signal value at the particular location at the site. In other words, an opportunity signal value may in particular be a result of a measurement on an opportunity signal at a particular location. As another example, the opportunity signal data may comprise model data, e.g. parameter based model data, indicating opportunity signal values for particular locations at the site. The opportunity signal values may in this case be calculated for particular locations at the site based on the model data.

Particularly in case the opportunity signal data indicates opportunity signals for more than one opportunity signal source, the opportunity signal data (e.g. each fingerprint or each opportunity signal value) may comprise an identifier of the opportunity signal source having sent the opportunity signal.

An opportunity signal value may in particular be suitable in order to aid in the determining of a position and/or orientation of a mobile device. An opportunity signal value may describe a physical quantity of the opportunity signal at the particular location. An opportunity signal may at least partially be location specific.

A site may for example be understood to be a geographic region or an (e.g. a 2- or 3-dimensional) area on the surface of the earth. A site may for instance be or comprise one or more buildings (e.g. public buildings such as shopping malls, office buildings, hospitals etc.) or a part thereof. The opportunity signal source may in particular be located at the site or close to the site, such that an opportunity signal of the respective source is receivable at least at certain locations at the site.

The opportunity signal data pertains to an opportunity signal source. This is understood to mean that the opportunity signal data pertains to at least one opportunity signal source. The opportunity signal data may thus relate to a single opportunity signal source or to multiple opportunity signal sources. As an example, the opportunity signal data only pertains to opportunity signal sources of a certain type or category, e.g. only to WLAN communication nodes.

Opportunity signal data may be obtained by receiving opportunity signal data from a remote location, for example. For instance, the opportunity signal data may be obtained from a mobile device, which is sending the opportunity signal data to a (remote) server. This may in particular be the case for the new opportunity signal data. As another example, the opportunity signal data may be obtained from a memory, e.g. a memory of the apparatus performing the method according to the first aspect. This may in particular be the case for the previous opportunity signal data.

Previous opportunity signal data is in particular considered opportunity signal data, which may already be used for positioning purposes. For instance, the previous opportunity signal data may be older (i.e. may have been collected or determined longer ago) than the new opportunity signal data. The previous opportunity signal data may have been collected during a former survey. For instance, fingerprints may have been collected from one or multiple mobile devices and used for the previous opportunity signal data. Previous opportunity signal data may be stored or used in a database of a positioning server, for example. Accordingly, opportunity signal values indicated by previous opportunity signal data may thus be termed previous opportunity signal values.

New opportunity signal data may not yet be used for positioning purposes or may not yet be stored or used in a database of a positioning server. For instance, the new opportunity signal data may be more recent (i.e. may have been collected or determined more recently) than the previous opportunity signal data. The new opportunity signal data may have been collected during a recent survey. For instance, for the new opportunity signal data fingerprints may have been collected from one or multiple mobile devices. Accordingly, opportunity signal values indicated by new opportunity signal data may thus be termed new opportunity signal values.

The comparing of at least a part of the opportunity signal values of the new opportunity signal data and the opportunity signal values of the previous opportunity signal data for corresponding locations may for example be a pairwise comparison of signal values of the new opportunity signal data and the opportunity signal values of the previous opportunity signal data for corresponding locations. In other words, there is a comparison between an opportunity signal value of the new opportunity signal data and an opportunity signal value of the previous opportunity signal data in each case. For instance, an opportunity signal value of the new opportunity signal data and an opportunity signal value of the previous opportunity signal data is compared for each location, for which both an opportunity signal value of the new opportunity signal data and an opportunity signal value of the previous opportunity signal data is available. Locations may be understood to be corresponding if they are the same location or within a certain distance, so that the locations can be considered to be the same location (e.g. within a spatial resolution of the opportunity signal data). As an example, locations may be understood as corresponding, if they would be mapped to the same grid point of a grid representing the site.

The comparing of the opportunity signal values of the new opportunity signal data and the opportunity signal values of the previous opportunity signal data for corresponding locations may for example be performed for all locations, for which at least the new opportunity signal data comprises an opportunity signal value. Alternatively, the comparing of the opportunity signal values of the new opportunity signal data and the opportunity signal values of the previous opportunity signal data for corresponding locations may for example be performed for all locations, for which both the new opportunity signal data and the previous opportunity signal data comprises an opportunity signal value.

Based at least in part on the comparing a classification of the opportunity signal source is then performed. Classifying an opportunity signal source may comprise assigning one or more classifications to the opportunity signal source. An opportunity signal source may be classified into one or several classifications. An opportunity signal source may be classified as a whole or only with respect to a part of the opportunity signal data or only with respect to certain locations. For example, certain locations covered by the opportunity signal source may be classified separately. As an example, in case the site is or comprises a building, an opportunity signal source may be classified separately for each floor on which opportunity signals can be received from the opportunity signal source. Thus, an opportunity signal source may have a different classification for different floors. However, the classification may also be based on additional factors. It may also be possible, that certain classifications are based on the comparing of the opportunity signal values for corresponding locations, while other classifications are not based on or independent from said comparing. To name an example, if the new opportunity signal data pertaining to an opportunity signal source indicates not enough opportunity signal values, a classification may not be based on the described comparing. The classification of an opportunity signal source may indicate how to handle the new and/or previous opportunity signal data. Thus, the classification may have influence on how the new and/or previous opportunity signal data will be handled in particular with respect to an updating of a database comprising the previous opportunity signal data.

The described method may also be performed for multiple opportunity signal sources. The comparison and classification may then be performed for each of the opportunity signal sources.

By comparing the opportunity signal values of the new opportunity signal data and the opportunity signal values of the previous opportunity signal data for corresponding locations at the site and by utilizing this comparing for classifying the opportunity signal source, it may efficiently be decided how to handle the new opportunity signal data with respect to the previous opportunity signal data. In particular the described comparing and classifying may allow for learning changes of the infrastructure at the site automatically from the data, especially infrastructure changes which result due to the change of the environment (e.g. construction or deconstruction of structures) without the change of the position of the opportunity signal source. For instance, if only the position of an opportunity signal source estimated based on the new data and on the previous data was compared, an environmental change without the change of the position of the opportunity signal source would probably not be detected. Thus, the presented method, by comparing opportunity signal values for corresponding locations, may in particular reduce or prevent a deterioration of the performance of positioning based on the opportunity signal data, even if the location of the opportunity signal source has not changed.

According to an exemplary embodiment of the different aspects, the compared opportunity signal values are susceptible to an environmental change in an environment of the opportunity signal source. As already described, an example of an environmental change is the construction or deconstruction of a structure at the site, for example. By utilizing opportunity signal values, which are susceptible to an environmental change, the comparison may reliably provide an indication of whether an environmental change in an environment of the opportunity signal source has occurred, even if the position of the opportunity signal source has not changed.

According to an exemplary embodiment of the different aspects the comparing comprises:
  determining differential values between opportunity signal values of the new opportunity signal data and opportunity signal values of the previous opportunity signal data for corresponding locations at the site.

A determination of a differential value may comprise a subtraction of an opportunity signal value of one opportunity signal data from an opportunity signal value of the other opportunity signal data (i.e. a subtraction of an opportunity signal value of the new opportunity signal data from an opportunity signal value of the previous opportunity signal data or a subtraction of an opportunity signal value of the previous opportunity signal data from an opportunity signal value of the new opportunity signal data). In case an opportunity signal value is a multidimensional value, the norms of the respective opportunity signal values may be used for determining the differential values between the opportunity signal values. Preferably, the absolute value of the result of the subtraction is determined. The determination is in particular performed for each pair of opportunity signal values of the new opportunity signal data and the previous opportunity signal data for corresponding locations, for which data is available. This may have the effect, that a structural environmental change may readily and automatically be detectable.

According to an exemplary embodiment of the different aspects the comparing comprises:
  creating, based on the new opportunity signal data, a new grid representing at least a part of the site and indicating, at grid points, the opportunity signal values indicated by the new opportunity signal data;
  creating, based on the previous opportunity signal data, a previous grid representing at least a part of the site and indicating, at grid points, the opportunity signal values indicated by the previous opportunity signal data; and
  creating a differential grid based on the determining of differential values between opportunity signal values of the new opportunity signal data and opportunity signal values of the previous opportunity signal data for corresponding locations at the site.

A grid may be defined by a data structure comprising respective opportunity signal values at respective grid points. A grid may be defined by a table or matrix, for example, storing the opportunity signal values. The grid may be a two dimensional or three dimensional grid, for example. The particular locations at the site may be mapped to grid points of the grid. Thus, a grid point may represent a particular location at the site at which the opportunity signal value assigned to the grid point was measured or is estimated to be measurable. In one example, a grid point may be referenced by its horizontal location, e.g. latitude and longitude, and its vertical location, e.g. height or floor number. It may be the case that a location indicated by the opportunity signal data is mapped to the grid point representing the closest location to the indicated location and assigning the opportunity signal value to this grid point. As already described, corresponding locations may then be understood to be locations which are mapped to the same grid point.

As an example, the opportunity signal values of an opportunity signal source may be assigned to or stored in a single grid or a set of grids for different altitudes (e.g. different floors of a building) provided specifically for this opportunity signal source. The grid or set of grids may then be considered to be a map for the opportunity signal source. Alternatively, the opportunity signal values of multiple opportunity signal sources could be assigned to different areas of a single grid or a single set of grids for different altitudes (e.g. different floors of a building).

As an example, in order to create a grid, a list may be obtained based on the opportunity signal data. The list may comprise for each particular location at the site the available opportunity signal values and the corresponding identifiers of the opportunity signal sources to which the opportunity signal values pertain. A list may be obtained for the new opportunity signal data and for the previous opportunity signal data. Thus, for each opportunity signal source and for each particular location the available opportunity signal values can be obtained from the list.

For each opportunity signal source a differential grid or a set of grids (e.g. for different altitudes, e.g. for different floors) may then be provided for the site.

According to an exemplary embodiment of the different aspects the comparing comprises:
setting a differential value of opportunity signal values of the new opportunity signal data and the previous opportunity signal data for a corresponding location at the site to a filling value in case the previous opportunity signal data or the new opportunity signal data does not provide an opportunity signal value at the corresponding location at the site.

It may be the case that for certain locations at the site a previous opportunity signal value is not available for a certain opportunity signal source (e.g. because at the time the particular location was outside of the coverage are of the opportunity signal source or because no data was collected for the particular location). It may also be the case that for certain locations at the site a new opportunity signal value is not available for a certain opportunity signal source (e.g. because the opportunity signal source is not active anymore or has disappeared). As a differential value of opportunity signal values of said new opportunity signal data and said previous opportunity signal data for a corresponding location at the site may then not be defined or may not be sufficiently meaningful, it may be preferred that the differential value is set to a filling value. A filling value may be a predefined value, for example. In one example, the filling value is the maximum differential value determined for two opportunity signal values for the opportunity signal source. Setting a differential value for a corresponding location to a filling value may be realized by setting the value at a grid point of the differential grid to the filling value.

In one example, differential values between opportunity signal values of the new opportunity signal data and opportunity signal values of the previous opportunity signal data for corresponding locations at the site are first determined for corresponding locations for which both the new opportunity signal data and the previous opportunity signal data comprises an opportunity signal value (e.g. where both the new grid and the previous grid comprise an opportunity signal value for corresponding grid points). Then, for the remaining opportunity signal values of said new opportunity signal data, for which the previous opportunity signal data does not provide an opportunity signal value at the corresponding location at the site, the differential value of the opportunity signal values is set to be the filling value (e.g. the differential values of the differential grid are set to the filling value).

According to an exemplary embodiment of the different aspects the classifying comprises:
determining a central value and/or a variation value of the determined differential values for the opportunity signal source.

Generally, a single central and/or variation value or multiple central and/or variation values may be determined for a single opportunity signal source (e.g. a central and/or variation value per opportunity signal source and per floor).

A central value may in particular be a mean, also referred to as arithmetic mean, mathematical expectation or average, that is in particular the sum of the differential values divided by the number of differential values. In another example, the central value may be the median.

A variation value of the determined differential values may be understood as a measure to quantify the amount of variation or dispersion of differential values. For instance, the variation value may be the standard deviation of the differential values.

In case the presented method is performed for multiple opportunity signal sources, for each opportunity signal source (at least) a central value and/or a variation value is determined for each opportunity signal source. Thus, the classifying may in particular comprise determining a central value and/or variation value of the determined differential values for each opportunity signal source.

The reduction of multiple differential values to a central value and/or a variation value provides sufficient information and allows for a reliable and automated classifying of opportunity signal sources.

According to an exemplary embodiment of the different aspects the classifying comprises:
checking whether said central value and/or said variation value exceeds or falls short of a respective threshold value.

The threshold value may be understood to represent an acceptable or unacceptable difference between opportunity signal values of the previous opportunity signal data and the new opportunity signal data or variation thereof. The threshold value for the central value may be different from the central value for the variation value. A threshold value may for example be a predetermined threshold value. Based on the result of the checking whether said central value and/or said variation value exceeds or falls short of a respective threshold value, a classification for the opportunity signal source can be chosen.

According to an exemplary embodiment of the different aspects the threshold value is at least partially a location specific threshold value. For instance, the threshold value may be specific for a site or a part thereof. The threshold value may be the same for a site or only for parts thereof. For example, the threshold value may be chosen in dependence of whether the site is part of or comprises a building. For example, the threshold value may be chosen in dependence of the kind of building, e.g. whether the building is an office building, a factory or a shopping mall. For instance, the threshold value may be chosen in dependence of the kind area in a building (e.g. in dependence of the room size). For instance, a threshold value may be specific for each grid or a set of grids representing a site or a part thereof.

According to an exemplary embodiment of the different aspects the threshold value is at least in part based on central values and/or variation values determined for multiple opportunity signal sources.

The multiple opportunity signal sources may be located at the site, for instance. The central values or variation values of other (e.g. surrounding) opportunity signal sources, which may in particular be determined as described above, may provide for a reliable threshold value, which is adapted to the characteristics of the site or the part thereof.

For instance, the threshold value for a central value is determined by a central value (e.g. the mean or median) of the central values determined for the multiple opportunity signal sources. For instance, the threshold value for a variation value is determined by a central value (e.g. the mean or median) of the variation values determined for the multiple opportunity signal sources.

According to an exemplary embodiment of the different aspects the classifying of the opportunity signal source provides for at least two, preferably at least four classifications. By utilizing at least two, preferably at least four classifications the new opportunity signal data can be dealt with as required by the situation in most or all of the cases. However, as classifying the opportunity signal source may only be based in part on the comparing as described, only a subset of the classifications may be chosen based on the comparing. The further classifications may be chosen based on other factors, for example.

According to an exemplary embodiment of the different aspects the classifying of the opportunity signal source provides for one or more of the following classifications:
compatible opportunity signal source;
incompatible opportunity signal source;
indifferent opportunity signal source; and
new opportunity signal source.

A compatible opportunity signal source may be understood as an opportunity signal source, for which new opportunity signal data pertaining to the opportunity signal source was obtained, and which opportunity signal data is compatible with (e.g. sufficiently similar to) the previous opportunity signal data pertaining to the opportunity signal source. If an opportunity signal source is classified as a compatible opportunity signal source, the new opportunity signal data pertaining to the compatible opportunity signal source may be used to supplement the previous opportunity signal data pertaining to the compatible opportunity signal source. For instance, the new opportunity signal data pertaining to the compatible opportunity signal source may be merged with the previous opportunity signal data pertaining to the compatible opportunity signal source. For instance, it may be decided to update a database (e.g. of a positioning server) to rely on both, the previous and the new opportunity signal data.

An incompatible opportunity signal source may be understood as an opportunity signal source, for which new opportunity signal data pertaining to the opportunity signal source was obtained, and which opportunity signal data is incompatible with (e.g. not sufficiently similar to) the previous opportunity signal data pertaining to the opportunity signal source. If an opportunity signal source is classified as an incompatible opportunity signal source, the previous opportunity signal data pertaining to the incompatible opportunity signal source may not be used anymore. For instance, the previous opportunity signal data pertaining to the incompatible opportunity signal source may be ignored or deleted and only the new opportunity signal data pertaining to the incompatible opportunity signal source may be used. For instance, it may be decided to update a database (e.g. of a positioning server) to only rely on the new opportunity signal data.

An indifferent opportunity signal source may be understood as an opportunity signal source, for which it cannot be decided whether the previous opportunity signal data is up to date or needs to be updated. This may be the case, if there is previous opportunity signal data pertaining to the indifferent opportunity signal source, but if there is no or not sufficient new opportunity signal data (e.g. not enough opportunity signal values) pertaining to the indifferent opportunity signal source. For instance, it may be decided to not update a database (e.g. of a positioning server) and to only rely on the previous opportunity signal data. In this case the classification may not rely on the comparison as described.

A new opportunity signal source may be understood as an opportunity signal source, for which new opportunity signal data pertaining to the opportunity signal source was obtained but for which not sufficient previous opportunity signal data (e.g. not enough opportunity signal values) pertaining to the opportunity signal source is available. For instance, it may be decided to update a database (e.g. of a positioning server) to only rely on the new opportunity signal data. In this case the classification may not rely on the comparison as described.

According to an exemplary embodiment of the different aspects the opportunity signal source is classified as a compatible opportunity signal source, in case the compared opportunity signal values of the new opportunity signal data pertaining to the opportunity signal source of the site and the opportunity signal values of the previous opportunity signal data pertaining to the opportunity signal source of the site are sufficiently similar; and/or wherein said opportunity signal source is classified as an incompatible opportunity signal source, in case said compared opportunity signal values of said new opportunity signal data pertaining to said opportunity signal source of said site and said opportunity signal values of said previous opportunity signal data pertaining to said opportunity signal source of said site are not sufficiently similar.

Opportunity signal values may be considered sufficiently similar if a central value and/or a variation value is not exceeding or falling short of a respective threshold value, as already explained. Accordingly, opportunity signal values may not be considered sufficiently similar if a central value and/or a variation value exceeds or falls short of a respective threshold value.

According to an exemplary embodiment of the different aspects the previous opportunity signal data is obtained from a database and the method further comprises:

updating or triggering updating the database based on the classifying of the opportunity signal source.

The database may be a positioning database or a database of a positioning server. The database may comprise previous opportunity signal data pertaining to various opportunity signal sources of various sites. Therefore, the method may be understood as a method for updating or triggering updating the database. The actions to be performed for the updating of the database, that is in particular the handling of the new opportunity signal data (or a part thereof) pertaining to an opportunity signal source, may then be individually decided for each opportunity signal source or for only a part of the new opportunity signal data pertaining to the opportunity signal source (e.g. new opportunity signal data pertaining to the opportunity signal source with respect to a certain altitude, e.g. a floor).

According to an exemplary embodiment of the different aspects the method is performed for multiple opportunity signal sources. The opportunity signal sources may all be opportunity signal sources located at the site and/or in the environment of the site. The described actions may be performed for each of the multiple opportunity signal sources.

For instance, the method may comprise obtaining new opportunity signal data pertaining to multiple opportunity signal sources and indicating opportunity signal values of these multiple opportunity signal values for particular locations at the site. Further, the method may comprise obtaining, if available, previous opportunity signal data pertaining to these multiple opportunity signal sources and indicating opportunity signal values of these multiple opportunity signal sources for particular locations at the site. Accordingly, the method may also comprise comparing at least a part of the opportunity signal values of the new opportunity signal data pertaining to the multiple opportunity signal sources of the site and the opportunity signal values of the previous opportunity signal data pertaining to the multiple opportunity signal sources of the site for corresponding locations at the site. In this case, opportunity signal values for corresponding locations and for the same opportunity signal source are compared. Accordingly, each or at least a part of the multiple opportunity signal sources can be classified based at least in part on said comparing.

In one example, the classifying may comprise creating a list comprising information representative of one or more of the following: an opportunity signal source identifier, a building identifier, a floor identifier, a central value determined for the opportunity signal source indicated by the opportunity signal source identifier with respect to certain locations (e.g. with respect to the floor indicated by the floor identifier), and a variation value determined for the opportunity signal source indicated by the opportunity signal source identifier with respect to certain locations (e.g. with respect to the floor indicated by the floor identifier).

According to an exemplary embodiment of the different aspects the opportunity signal source is a communication node located at the site or in an environment of the site. A (terrestrial) communication node may have the purpose of sending and/or receiving communication signals. A communication node may also have the function of broadcasting information. A communication node may considered to be located in the environment of the site if an opportunity signal of the communication node may be received at the site, in particular if the received signal strength of the opportunity signal is above a threshold value.

According to an exemplary embodiment of the different aspects the communication node is one of the following:
 a communication node of a Wireless Local Area Network (WLAN) system;
 a communication node of a Bluetooth (BT) system;
 a communication node of a Radio Frequency Identification (RFID) system; and
 a communication node of a cellular network system;

A communication node of a WALN system may be a WLAN access point, for example. A communication node of a Bluetooth system may be a Bluetooth (LE) Beacon, for example. A communication node of an RFID system may be a RFID tag, for example. A communication node of a cellular network system may be a cell site, e.g. for a 2G, 3G, 4G or 5G mobile communications system. The 2G/3G/4G/5G cellular radio communication standards are developed by the 3GPP and presently available under http://www.3gpp.org/. The Bluetooth standards are specified by the Bluetooth Special Interest Group and is presently available under https://www.bluetooth.com/. WLAN is for example specified by the standards of the IEEE 802.11 family (http://www.ieee.org/). Particularly, WLAN and Bluetooth communication nodes are already installed in many buildings. Furthermore, the above technologies are already supported in many mobile user devices, like smartphones, tablets, laptops and in the majority of feature phones. Using in particular WLAN access points, Bluetooth transmitters and/or BTLE transmitters as communication nodes may thus have the effect that the supported positioning can be based on an existing infrastructure in buildings and on existing capabilities in mobile devices. As a result, the approach may be globally scalable and have low maintenance and deployment costs. The deployment of new infrastructure, including for example beacons and tags, is not necessary. In addition, the end-user experience may be acceptable with these technologies, since a horizontal positioning accuracy of 2-3 meters as well as close to 100% reliability in floor detection may be achieved.

According to an exemplary embodiment of the different aspects the opportunity signal values comprises one or more of the following:
 a received signal strength;
 a timing measurement;
 an angel of arrival; and/or
 a magnetic field strength and/or direction.

For instance, in the case of measurements on cellular signals, the opportunity signal values may contain its (emitted/received) signal strength and/or path loss and/or timing measurement like propagation delay, timing advance (TA) or round-trip time (RTT). Further, the opportunity signal value may alternatively or additionally contain an angel of arrival (AOA) of the signal and/or a magnetic field strength and/or a magnetic field direction of the signal. For measurements on Bluetooth network signals or wireless local area network (WLAN) signals, as an example of signals of a non-cellular system, the opportunity signal value may contain the signal strength of received signals (received signal strength indication RSSI or physical Rx level in dBm with a reference value of 1 mW, for example).

Additionally, the opportunity signal data may comprise an identifier of the opportunity signal source corresponding to the opportunity signal value (i.e. having sent the opportunity signal). The opportunity signal source identifier may contain a global and/or local identifier. Non-limiting examples of an identifier are cellular cell identifiers (e.g. a Mobile Country Code (MCC), a Mobile Network Code (MNC), a Local Area Code (LAC) and/or a Cell Identity (CID) in case of coverage areas of a 2G mobile communications system, a UTRAN Cell ID (UC-ID) in case of a 3G mobile communications system, or an LTE Cell Identity in case of a 4G communications system). Another example of an opportunity signal source identifier is a basic service set identification (BSSID), like the medium access control (MAC) address of an access point (AP), or the service set identifier (SSID) of the access point.

According to a second exemplary aspect of the disclosure, an apparatus comprising means for performing the steps of the method according to the first aspect.

The means of the presented apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The presented apparatus may comprise a single means for all functions, a common plurality of means for all functions, or a plurality of different means for different functions.

According to the second exemplary aspect of the disclosure, another apparatus is described, comprising at least one processor and at least one memory including computer program code for one or more programs, the at least one memory and the computer program code configured to, with the at least one processor, cause the apparatus to perform the steps of the method according to the first aspect.

According to an exemplary embodiment of the different aspects, the apparatus may be one of:
a chip;
a module for a server;
a server;
a module for a mobile or stationary device; and
a mobile or stationary device.

The apparatus may be an apparatus for storing and/or updating a database, e.g. a positioning database or a positioning server.

According to a third exemplary aspect of the disclosure, a computer program code is described, the computer program code when executed by a processor causing an apparatus to perform the steps of the method according to the first aspect.

According to a fourth exemplary aspect of the disclosure, a non-transitory computer readable storage medium including one or more sequences of one or more instructions which, when executed by one or more processors, cause an apparatus to perform the steps of the method according the first aspect. The non-transitory computer readable storage medium may be tangible. The computer program code causes at least one apparatus to perform the steps of any one embodiment of the presented method when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

The features and example embodiments of the disclosure described above may equally pertain to the different aspects according to the present disclosure.

It is to be understood that the presentation of the disclosure in this section is merely by way of examples and non-limiting.

Other features of the disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 6 schematically illustrates a list used for classifying different opportunity signal sources.

DETAILED DESCRIPTION OF THE FIGURES

Figure 1A:
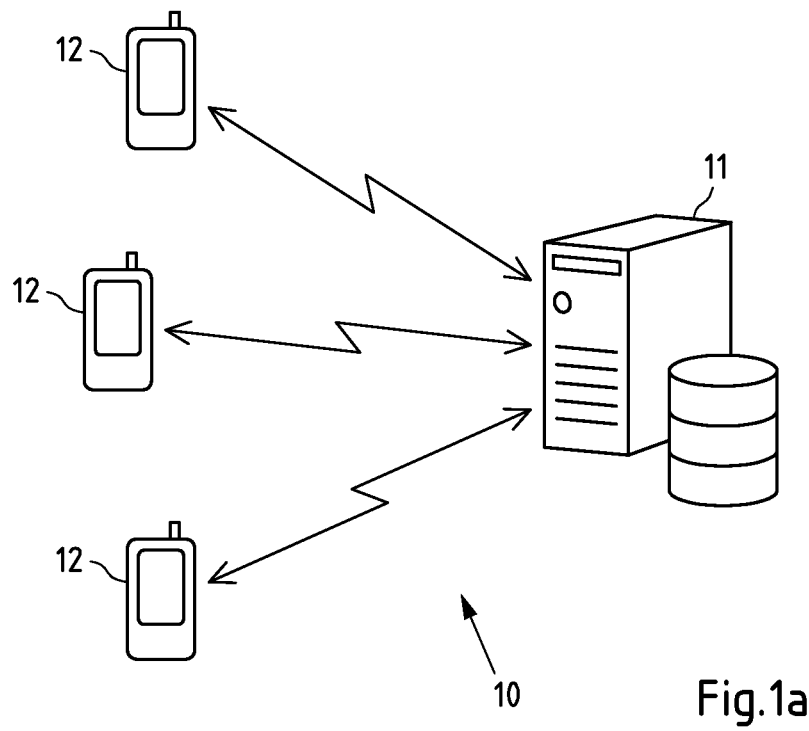
FIG. 1a is a block diagram of a system.

FIG. 1a is a schematic high-level block diagram of a system 10. System 10 comprises a server 11, which may alternatively be embodied as a server cloud (e.g. a plurality of servers connected e.g. via the internet and providing services at least partially jointly), and mobile devices 12. Mobile devices 12 may be collecting devices for collecting new opportunity signal data. Server 11 may obtain new opportunity signal data from mobile devices 12. Communication between server 11 and mobile devices 12 may for example take place at least partially in a wireless fashion, e.g. based on cellular radio communication or on Wireless Local Area Network (WLAN) based communication, to name but a few examples.

Figure 1B:
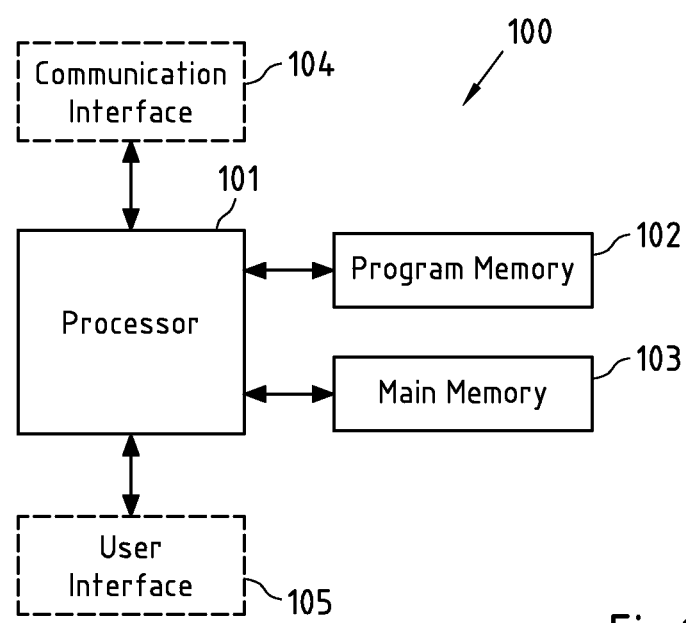
FIG. 1b is a schematic block diagram of an example embodiment of an apparatus according to the disclosure.

FIG. 1b is a block diagram of an apparatus 100 according to an exemplary aspect of the disclosure. Apparatus 100 may for example represent server 11 of system 10. Alternatively or additionally, apparatus 100 may for example represent a mobile device 12 of system 10.

Apparatus 100 comprises a processor 101. Processor 101 may represent a single processor or two or more processors, which are for instance at least partially coupled, for instance via a bus. Processor 101 executes a program code stored in program memory 102 (for instance program code causing apparatus 100 to perform one or more of the embodiments of a method (or parts thereof) according to the first aspect (as for instance further described below with reference to FIG. 2), when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for instance comprise a positioning database. Additionally or alternatively apparatus 100 may be connected to a positioning database (not shown).

Main memory 103 may for instance be a volatile memory. It may for instance be a DRAM memory, to give non-limiting example. It may for instance be used as a working memory for processor 101 when executing an operating system and/or programs.

Processor 101 further controls an optional communication interface 104 configured to communicate with other devices (e.g. with a mobile device, which may be a collecting device for collecting new opportunity signal data), for example by receiving and/or sending data and/or information. The communication may for example be based on a wireless communication connection. The communication interface 104 may thus comprise circuitry such as modulators, filters, mixers, switches and/or one or more antennas to allow wireless transmission and/or reception of signals. In embodiments of the disclosure, communication interface 104 is inter alia configured to allow communication based on a cellular radio communication (e.g. a 2G/3G/4G/5G cellular radio communication) and/or a non-cellular radio communication (e.g. a WLAN or Bluetooth communication). Alternatively or additionally, the communication may equally well be based on a wirebound communication connection or a combination of wireless and wirebound communication connections. Accordingly, the communication interface 104 may thus comprise circuitry such as modulators, filters, mixers, switches to allow a wirebound transmission and/or reception of signals. In embodiments of the disclosure, communication interface 104 is inter alia configured to allow communication based on an Ethernet communication such as a LAN (Local Area Network) communication.

Processor 101 further controls an optional user interface 105 configured to present information to a user of apparatus 100 and/or to receive information from such a user. User interface 105 may for instance be the standard user interface via which a user of apparatus 100 controls other functionality thereof. Examples of such a user interface are a touch-sensitive display, a keyboard, a touchpad, a display, etc.

The components 102-105 of apparatus 100 may for instance be connected with processor 101 by means of one or more serial and/or parallel busses.

It is to be understood that apparatus 100 may comprise various other components (e.g. a positioning sensor such as a Global Navigation Satellite System (GNSS) sensor).

Figure 2:
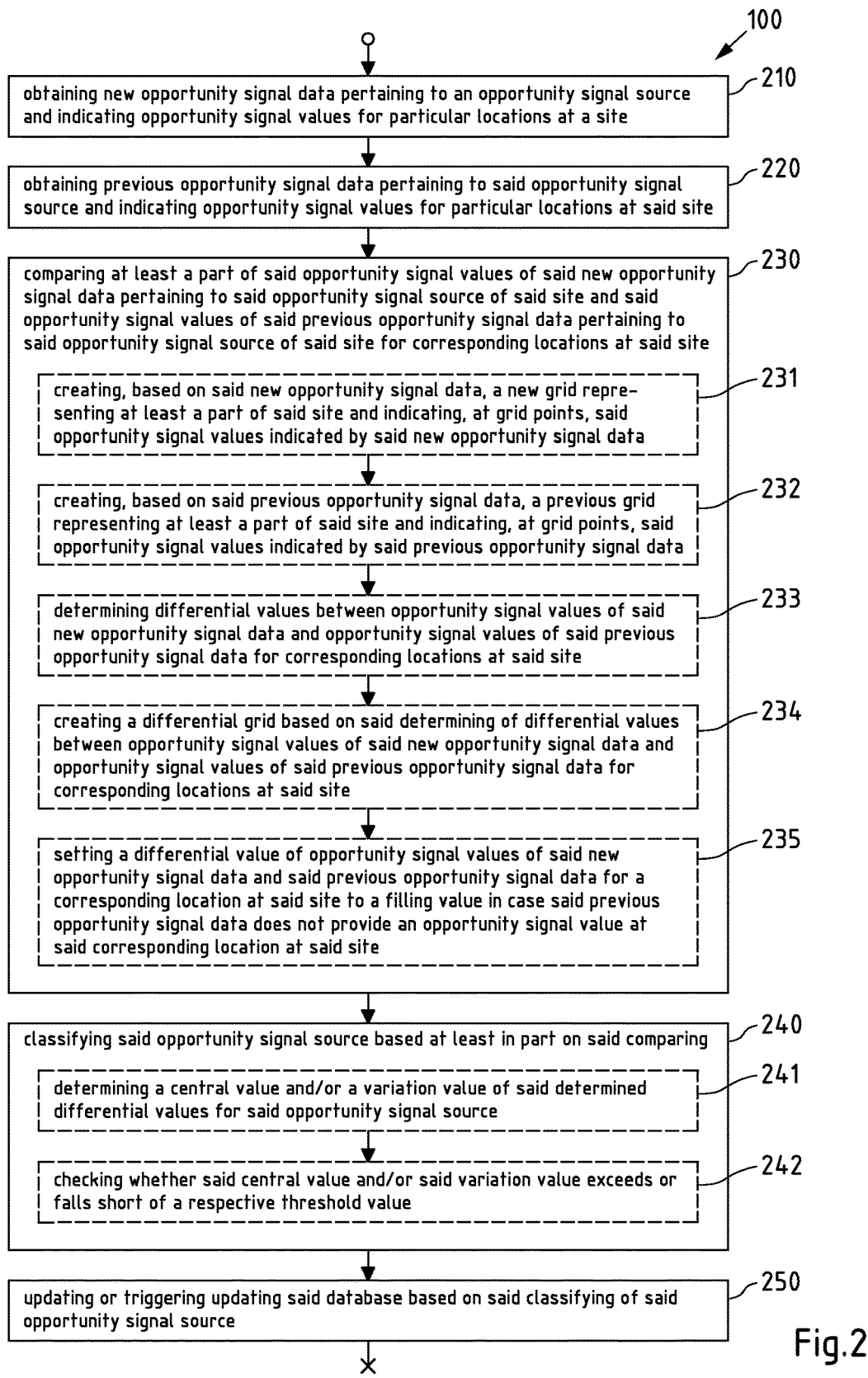
FIG. 2 is a flow chart illustrating an example embodiment of a method according to the disclosure.

FIG. 2 is a flowchart 200 illustrating an exemplary embodiment of a method according to the disclosure. In the following, it is assumed that the steps of this flowchart 200 are performed by server 11 of FIG. 1.

In the following example, the opportunity signal sources are wireless access points identified by BSSIDs and the opportunity signal values are RSS values. However, other opportunity signals and opportunity signal sources may alternatively or additionally be used.

First, new opportunity signal data pertaining to an opportunity signal source and indicating opportunity signal values for particular locations at a site is obtained (action 210). The new opportunity signal data may have been collected by one or more of the mobile collecting devices 12. The mobile collecting devices 12 may also have collected new opportunity signal data pertaining to multiple opportunity signal sources at the site. The new opportunity signal data may be sent to the server 11, which may receive the new opportunity signal data.

Also, previous opportunity signal data pertaining to the (same) opportunity signal source (or the same opportunity signal sources) and indicating opportunity signal values for particular locations at the site is obtained (action 220). Server 11 may obtain the previous opportunity signal data from a positioning database, which may be part of server 11, storing previous opportunity signal data, for instance.

At least a part of the opportunity signal values of the new opportunity signal data pertaining to the opportunity signal source (or the opportunity signal sources) of the site and the opportunity signal values of the previous opportunity signal data pertaining to the (same) opportunity signal source (or the same opportunity signal sources) of the site for corresponding locations at the site (action 230).

In the described embodiment, the comparing comprises the following actions.

Based on the new opportunity signal data, a new grid is created representing at least a part of the site and indicating, at grid points, the opportunity signal values indicated by the new opportunity signal data (action 231). Also, based on the previous opportunity signal data, a previous grid is created representing at least a part of the site and indicating, at grid points, the opportunity signal values indicated by the previous opportunity signal data (action 232). In case of multiple opportunity signal sources, a new or previous grid may comprise opportunity signal values of different opportunity signal sources, which may be identified by a respective opportunity signal source identifier. Alternatively, for each opportunity signal source a separate new or previous grid may be used.

In one example, a list is created or extracted, which comprises opportunity signal values (e.g. RSS values) and opportunity signal source identifiers (e.g. BSSIDs) of the respective opportunity signal sources for each location.

Differential values between opportunity signal values of the new opportunity signal data and opportunity signal values of the previous opportunity signal data are determined for corresponding locations at the site (action 233). Thus, a differential value is determined for each location and for each opportunity signal source (as far as data is available). Based on the determining of differential values between opportunity signal values of the new opportunity signal data and opportunity signal values of the previous opportunity signal data for corresponding locations at the site a differential grid is created (action 234). Thus, the differential grid indicates for each location or grid point (or a part thereof) and for each opportunity signal source (or a part thereof), an (absolute) differential value.

In case the previous opportunity signal data does not provide an opportunity signal value at the corresponding location at the site, the differential value of opportunity signal values of the new opportunity signal data and the previous opportunity signal data for the corresponding location at the site is set to a filling value, which is in this example a maximum differential value, determined for this opportunity signal source.

Figure 3:
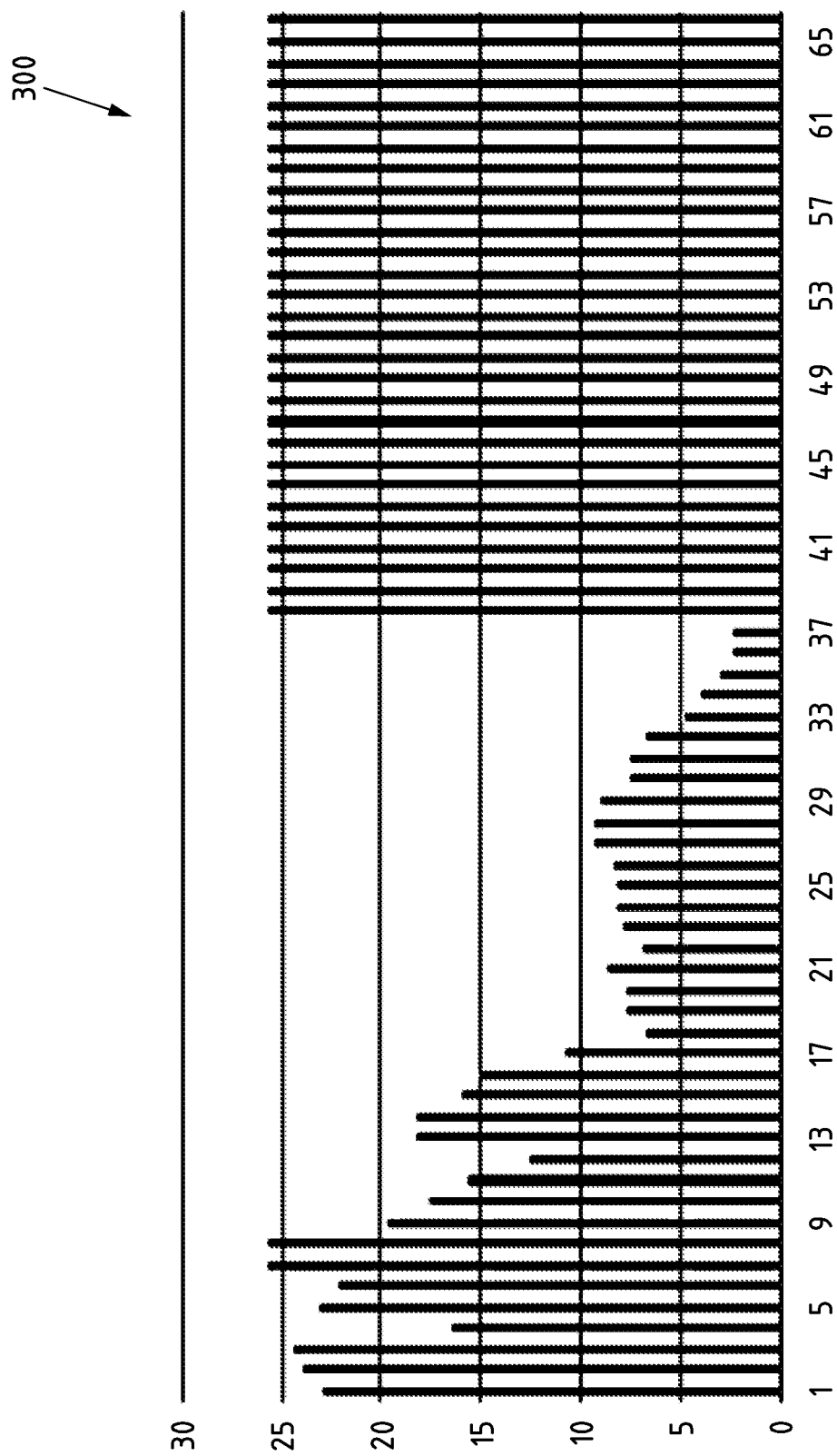
FIG. 3 is a diagram illustrating determined differential values for an opportunity signal source.

FIG. 3 is a diagram 300 exemplarily illustrating determined differential values for an opportunity signal source. The diagram shows on the vertical axis the differential RSS values for a specific wireless access point for different locations on the horizontal axis. The maximum determined differential value is "25". Accordingly, for the locations or grid points indicated by the higher numbers, the differential value was set to this maximum value, as for these locations an RSS value was available in the new grid but not in the previous grid.

The opportunity signal source can be classified based at least in part on the comparing (action 240). In particular, based on the comparing, the opportunity signal source can be classified as a "compatible" or "incompatible" signal source.

In the described embodiment, the comparing comprises the following actions.

A mean value (as a central value) and a standard deviation value (as a variation value) of the determined differential values for the opportunity signal source are determined (action 241). This may be done based on all opportunity signal values of an opportunity signal source or, preferably, only based on a part of the opportunity signal values of an opportunity signal source (e.g. for a certain floor of a building). In case of multiple opportunity signal sources, this is done for each of the opportunity signal sources.

Figure 4:
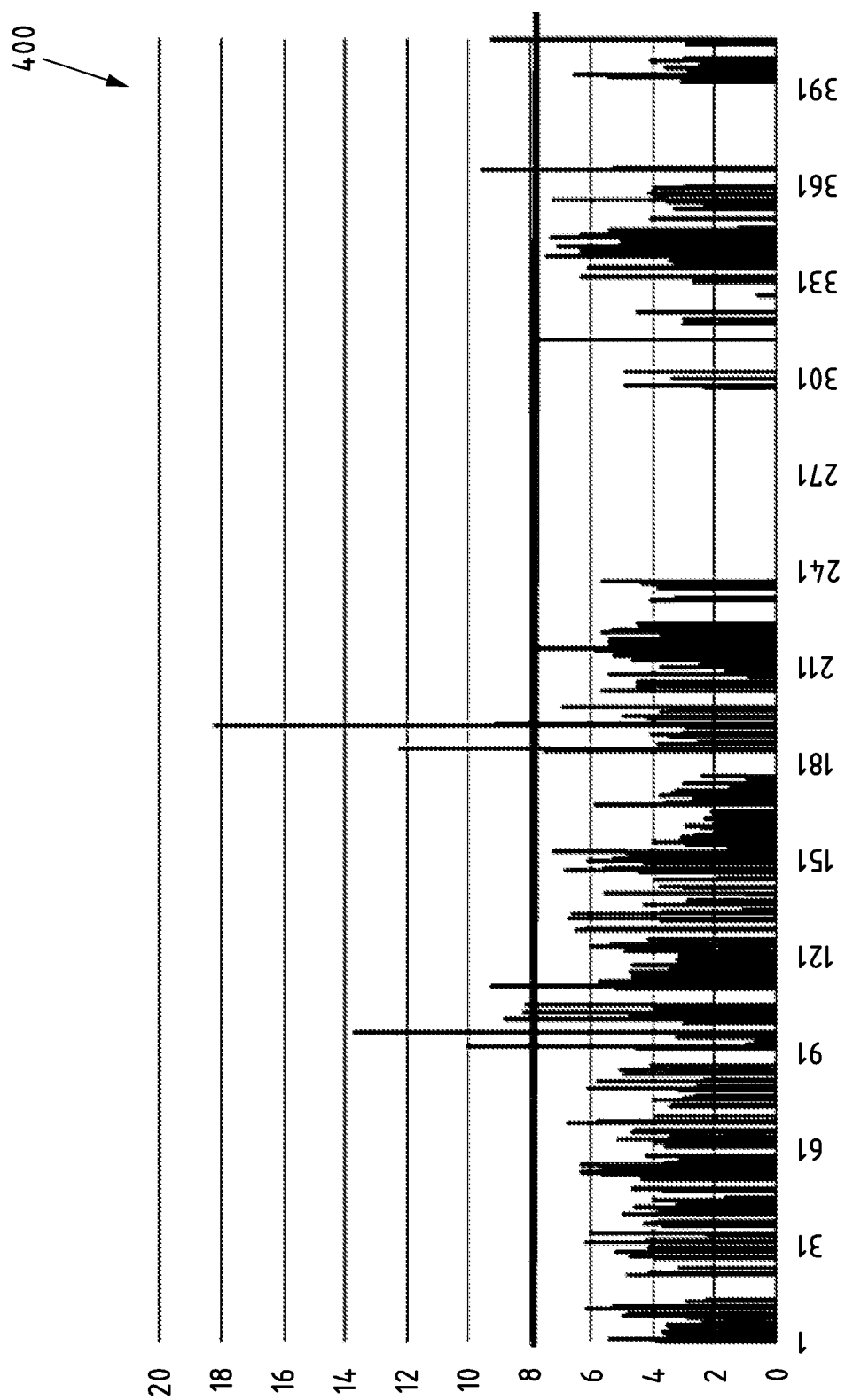
FIG. 4 is a diagram illustrating determined central values for different opportunity signal sources.

FIG. 4 is a diagram 400 exemplarily illustrating determined central values for different opportunity signal sources for individual floors. Specifically, the diagram shows on the vertical axis the mean RSS values for individual access points per floor on the horizontal axis.

Figure 5:
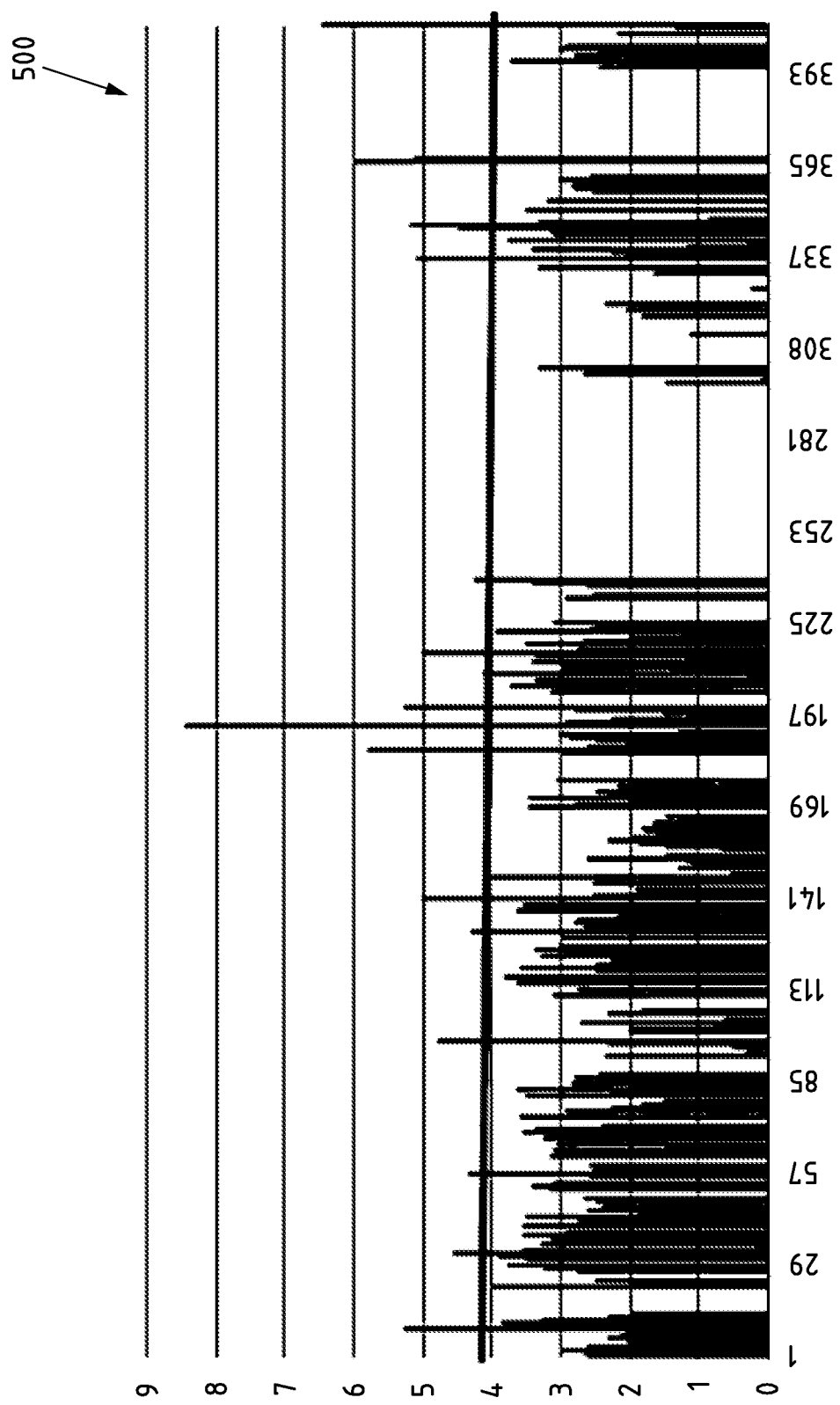
FIG. 5 is a diagram illustrating determined variation values for the different opportunity signal sources of FIG. 4.

Similarly, FIG. 5 is a diagram 500 exemplarily illustrating determined variation values for the different opportunity signal sources of FIG. 4. Specifically, the diagram shows on the vertical axis the standard deviation values for individual access points per floor on the horizontal axis.

No mean value or standard deviation value is determined for certain opportunity signal sources for a certain floor, as there is either no or not enough new and/or previous opportunity signal data available.

For each floor and for each opportunity signal source, it can now be checked whether the respective central value and/or the respective variation value exceeds or falls short of a respective threshold value (action 242).

FIG. 4 and FIG. 5 both illustrate an exemplary threshold value for the mean value and the standard deviation value, respectively, with a horizontal line. The threshold value can be a predefined value. Alternatively, as in the described example, the threshold value for the mean value is set to the mean of the determined mean values for different opportunity signal sources, while the threshold value for the standard deviation value is set to the mean of the determined standard deviation values for different opportunity signal sources.

The result of the classifying for different opportunity signal sources and different floors is shown in FIG. 6. FIG. 6 schematically illustrates an excerpt of a list 600 used for classifying different opportunity signal sources.

As far as data is available, the list 600 comprises for each opportunity signal source and for each floor a data set with one or more of a building identifier "BuildingID", a floor identifier "FloorID", an opportunity signal source identifier "BSSID", the mean value "MeanRSS", the standard deviation value "SdtRSS" and a classification.

For instance, for the data sets 1, 2, 3 and 4 the respective access point was classified as "compatible", as in each case the determined mean value and standard deviation value are below the threshold. For instance, for data set 16 the access point was classified as "new", as there was no previous opportunity signal data. For instance, for data set 23 the access point was classified as "incompatible" as the determined mean value and standard deviation value exceed the threshold. For instance, for data set 24 the access point was classified as "indifferent", as there was no or nor enough new opportunity signal data.

Based on the classifying of the opportunity signal sources the positioning database of server 11 can be updated (action 250). For a new opportunity signal source, the respective new opportunity signal data is added to the database. For a compatible opportunity signal source, the respective previous opportunity signal data and the respective new opportunity signal data is merged. For an indifferent opportunity signal source, the respective previous opportunity signal data is maintained in the database. For an incompatible opportunity signal source, the respective previous opportunity signal data is deleted from the database and the respective new opportunity signal data is added to the database.

After removal of the opportunity signal data of the incompatible opportunity signal sources the positioning performance could be improved.

The described procedures allow for updating a positioning database and signal of opportunity maps. The described actions enable automatic detection of infrastructure changes (in particular without the change of location of the opportunity signal source) and take appropriate actions. Updating of signal of opportunity maps can be automated and performed effectively. In particular time is saved, as no expert is needed to analyze a large amount of data manually to detect problems with the signal of opportunity maps.

Figure 7:
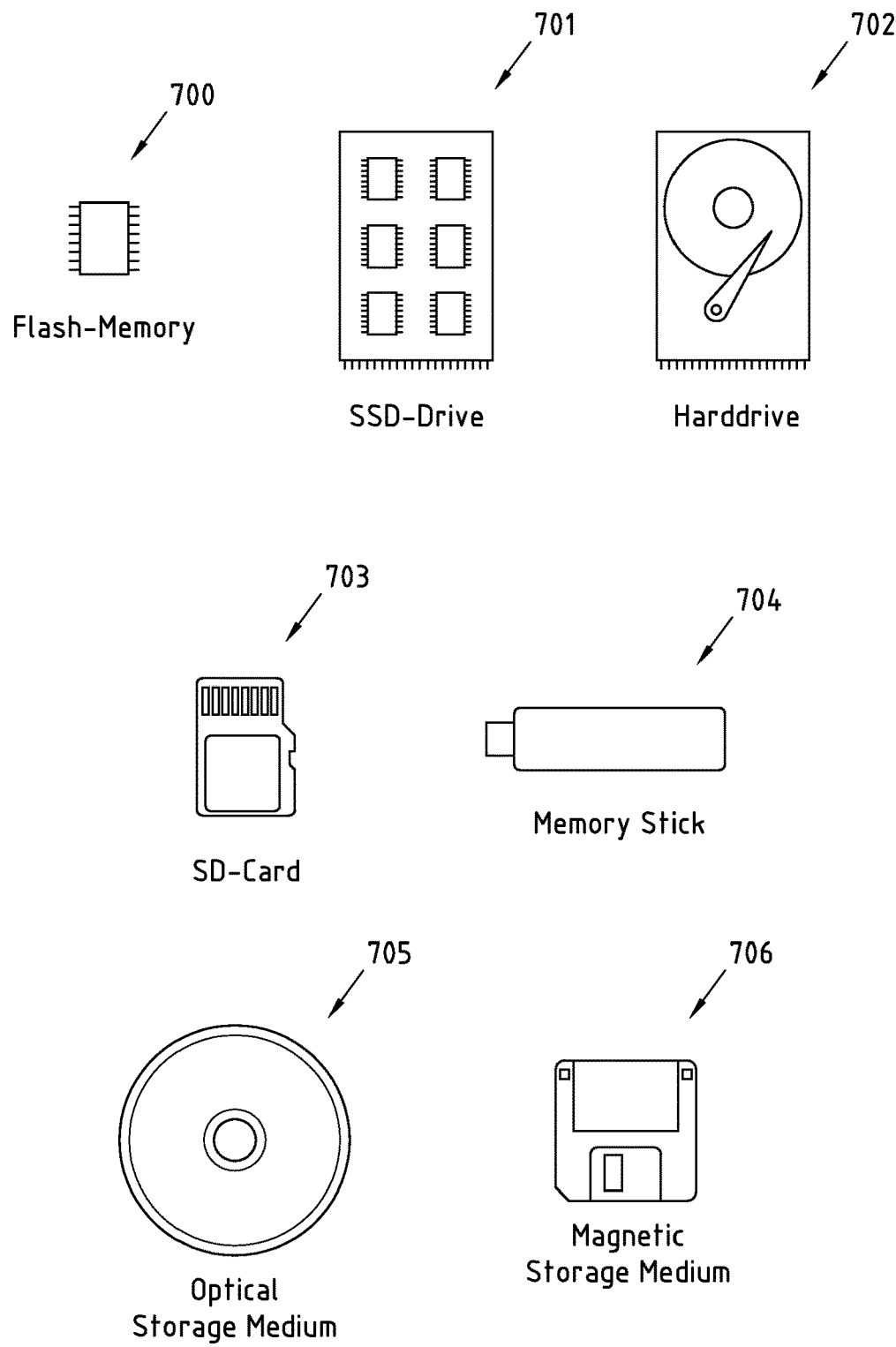
FIG. 7 schematically illustrates example storage devices.

FIG. 7 is a schematic illustration of examples of tangible storage media according to the present disclosure, that may for instance be used to implement memory of server 11 of FIG. 1a, or program memory 102 of FIG. 1b. To this end, FIG. 7 displays a flash memory 700, which may for instance be soldered or bonded to a printed circuit board, a solid-state drive 701 comprising a plurality of memory chips (e.g. Flash memory chips), a magnetic hard drive 702, a Secure Digital (SD) card 703, a Universal Serial Bus (USB) memory stick 704, an optical storage medium 705 (such as for instance a CD-ROM or DVD) and a magnetic storage medium 706.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
 (a) hardware-only circuit implementations (such as implementations in only analog and/or digital circuitry)
 (b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
 (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 101 of FIG. 1b could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

We claim:

1. A method for detection of infrastructure changes in opportunity signal data in a building, the method comprising:
   receiving first signal data for a communication node and indicating signal values for a plurality of locations;
   identifying, at a processor, signal values for a first floor of the building;
   identifying, at the processor, signal values for a second floor of the building;
   receiving second signal data for the communication node and indicating signal values for the plurality of locations;
   performing a comparison of the first signal data to previous signal values for the first floor of the building;
   performing a comparison of the second signal data to previous signal values for the second floor of the building;
   classifying, at the processor, the communication node for the first floor of the building to one of a predetermined set of classifications based on the comparison for the signal values for the first floor of the building; and
   classifying, at the processor, the communication node for the second floor of the building to one of a predetermined set of classifications based on the comparison for the signal values for the second floor of the building.

2. The method of claim 1, wherein the comparison includes a pairwise comparison of the first signal data and the second signal data at corresponding locations.

3. The method of claim 2, wherein the corresponding locations are defined as a same location within a spatial resolution.

4. The method of claim 1, further comprising:
   detecting a change in infrastructure in response to the comparison.

5. The method of claim 1, further comprising:
   mapping the plurality of locations to a grid, wherein the signal values are assigned to the grid.

6. The method of claim 5, wherein the grid includes a first identifier for the first floor of the building and a second identifier for the second floor of the building.

7. The method of claim 1, wherein the signal values include a received signal strength or a timing measurement.

8. The method of claim 1, wherein the signal values include an angle of arrival or a magnetic field characteristic including strength or direction.

9. The method of claim 1, wherein performing the comparison comprises:
   determining differential values between the first signal data to the second signal data;
   determining a central value or a variation value of the determined differential values for the communication node, and determining whether the central value or said variation value exceeds a respective threshold value.

10. The method of claim 1, further comprising:
    updating or triggering a database update based on the comparison.

11. The method of claim 1, wherein the communication node comprises:
    a communication node of a wireless local area network (WLAN) system;
    a communication node of a Bluetooth (BT) system;
    a communication node of a radio frequency identification (RFID) system;
    an access point; or
    a communication node of a cellular network system.

12. An apparatus comprising at least one processor and at least one memory including computer program code for one or more programs, the at least one memory and said computer program code configured to, with said at least one processor, cause said apparatus to perform:
    receiving first signal data for an access point and indicating signal values for a plurality of locations, wherein the first signal data includes signal values for a first floor of a building and signal values for a second floor of the building;
    receiving second signal data for the access point and indicating signal values for the plurality of locations;
    performing a comparison of the first signal data including signal values for the first floor of the building to previous signal values for the first floor of the building;
    performing a comparison of the second signal data including signal values for the second floor of the building to previous signal values for the second floor of the building; and
    classifying a type of the access point for the first floor of the building and for the second floor of the building based on the comparison.

13. The apparatus of claim 12, wherein the comparison includes a pairwise comparison of the first signal data and the second signal data at corresponding locations.

14. The apparatus of claim 13, wherein the corresponding locations are determined as a same location based on a spatial resolution.

15. The apparatus of claim 12, the at least one memory and said computer program code configured to, with said at least one processor, cause said apparatus to perform:
    detecting a change in infrastructure in response to the comparison.

16. The apparatus of claim 12, wherein the signal values include a received signal strength or a timing measurement.

17. The apparatus of claim 12, wherein the signal values include an angle of arrival or a magnetic field characteristic including strength or direction.

18. A server comprising:
- a communication interface configured to receive first signal data for an access point and indicating signal values for a plurality of locations and second signal data for the access point and indicating signal values for the plurality of locations, wherein the first signal data includes signal values for a first floor of a building and signal values for a second floor of the building;
- a processor configured to perform comparisons of the first signal data and for the second signal data to previously signal values and classify the access point as one of a compatible opportunity signal source, an incompatible opportunity signal source, an indifferent opportunity signal source, and a new opportunity signal source.

19. The server of claim 18, wherein the signal values include data for any two or more characteristics selected from a group of characteristics comprising a received signal strength, a timing measurement, an angle of arrival, a magnetic field strength, and a magnetic field direction.

20. The server of claim 19, wherein the processor is configured to determine differential values between the first signal data to the second signal data and determine a central value or a variation value of the determined differential values for the communication node, wherein a change in infrastructure is identified when the central value or said variation value exceeds a respective threshold value.

\* \* \* \* \*